Patented Feb. 13, 1923.

1,444,802

UNITED STATES PATENT OFFICE.

ERNST PREISWERK, OF BASEL, SWITZERLAND, ASSIGNOR TO THE HOFFMANN-LA ROCHE CHEMICAL WORKS, A CORPORATION OF NEW YORK.

CHEMICAL COMPOUND ISOPROPYLALLYLBARBITURIC ACID.

No Drawing.      Application filed June 27, 1921. Serial No. 480,806.

*To all whom it may concern:*

Be it known that I, ERNST PREISWERK, a citizen of Switzerland, and resident of Basel, Switzerland, have invented a certain new and useful Chemical Compound Isopropylallylbarbituric Acid, of which the following is a specification.

My invention relates to a new chemical compound isopropylallylbarbituric acid which may be produced by treating an alkali compound of mono-isopropylbarbituric acid with an allyl halide at a low temperature without application of pressure.

The hitherto unknown isopropylallylbarbituric acid forms colorless crystals of the melting point 137–138° C. It is rather difficultly soluble in water, easily soluble in alcohol and, compared with the di-alkylbarbituric acids already known, very easily soluble in ether. The aqueous solution reacts neutrally upon litmus paper. The new compound dissolves in a cold diluted solution of sodium hydroxide and by acidifying is precipitated unchanged from its alkaline solution. It dissolves readily in cold chloroform in a clear solution, in which colorless crystals will form, from which, when exposed to the air, the new compound will separate as a white powder.

Example.

170 parts of mono-isopropylbarbituric acid are mixed with 500 parts of water and dissolved by adding 135 parts of a 30 per cent solution of sodium hydroxide. When all is dissolved 130 parts of allylbromide are added and emulsified at an inner temperature of about 25° C. The reaction is at first accompanied by a slight development of heat. After 12 hours the reaction is brought to a close. When cooled down the isopropylallylbarbituric acid is drawn off. The yield is more than 80 per cent of the theoretically calculated quantity. By crystallization from diluted alcohol the pure isopropylallylbarbituric acid is obtained in colorless crystals of the melting point 137–138° C.

I claim:

As a new product isopropylallylbarbituric acid which can be obtained by treating an alkali compound of mono-isopropylbarbituric acid with an allyl halide, the acid forming colorless crystals of the melting point 137–138° C.; being rather difficultly soluble in water, easily soluble in alcohol and, compared with the di-alkylbarbituric acids already known, very easily soluble in ether, the aqueous solution reacting neutrally upon litmus paper; being furthermore easily soluble in cold chloroform, forming with it colorless crystals, from which, when exposed to the air, it separates in the form of a white powder.

In witness whereof I have hereunto set my hand.

ERNST PREISWERK.

Witnesses:
FRISLOR KURZ,
V. W. KAPPELER.